Patented Aug. 29, 1950

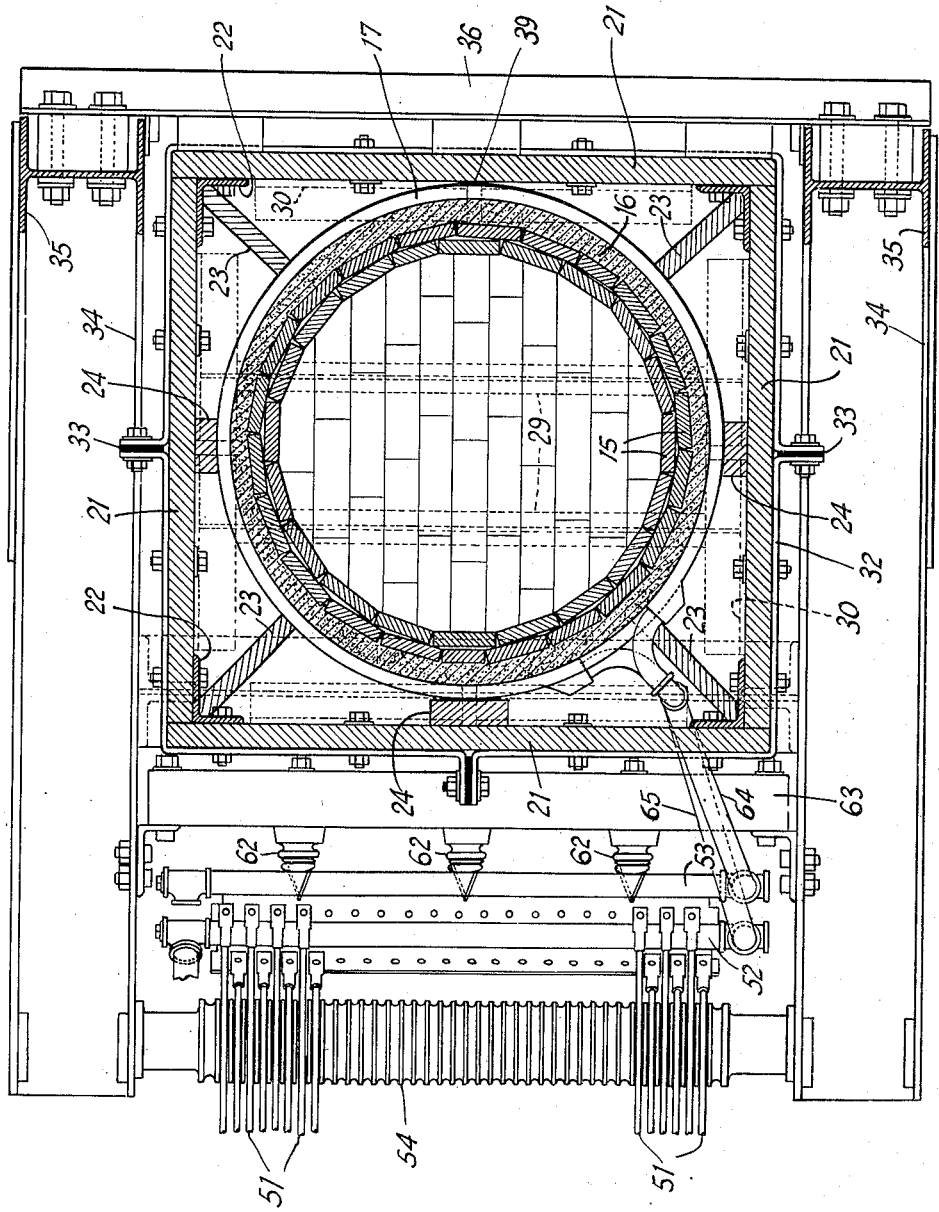

2,520,598

UNITED STATES PATENT OFFICE 2,520,598

TILTING TYPE ELECTRIC INDUCTION FURNACE

Isaac Harter, Jr., and Sidley O. Evans, Beaver, Pa., assignors to The Babcock & Wilcox Tube Company, West Mayfield, Pa., a corporation of Pennsylvania Application May 8, 1947, Serial No. 746,810

3 Claims. (Cl. 219—27)

The present invention relates to an improved construction of coreless electric induction furnaces of the lip pour tilting type and more particularly to a lightweight induction furnace for the holding and heating of molten metal for lip pour metal delivery at a controlled rate to a selected position and at a substantially uniform metal delivery temperature.

In accordance with our invention we provide a lip pour tilting type of molten metal holding furnace which is arranged for an accurate regulation of metal delivery therefrom. The rate of metal flow from the furnace is not only controllable by regulation of the furnace tilting angle, but we further provide a horizontally adjustable axis of tilting rotation for the furnace which can be regulated to control the delivery point of the metal poured. In addition, we provide electric induction heating of the molten metal within the furnace so as to establish and maintain the metal therein at an optimum pouring temperature. The molten metal temperature is maintained substantially uniform during the furnace pouring period by a continuation of the induced heating effect. This is accomplished by providing flexible power leads and cooling water connections to the furnace and a proper regulation of electric power input to the furnace during its tilting motion. Advantageously, the furnace is of an economical and lightweight construction wherein the selection of materials and the arrangement of parts provides a furnace that is easy to handle during its tilting movement while being safe to operate and has an electrical efficiency comparable with much heavier and more elaborate constructions.

The principal object of the present invention is to provide an electric induction furnace of the tilting type for pouring molten metal which is capable of establishing and maintaining an optimum temperature of molten metal therein during the pouring period. An additional and more specific object is to provide an electric induction furnace of the tilting type which is adapted for the delivery of molten metal at a predetermined substantially uniform temperature and controlled rate of delivery to a substantially uniformly positioned metal receiving position. An additional object is to provide a lightweight electric induction furnace of the lip pouring type which is tiltable about a horizontally adjustable transverse axis wherein the angle of tilt and the position of the axis are adjustable for a controlled delivery of molten metal to a predetermined fixed position.

The various features of novelty which characterize our invention are pointed out with particularity in the claims annexed to and forming a part of this specification. For a better understanding of the invention, its operating advantages and specific objects attained by its use, reference should be had to the accompanying drawings and descriptive matter in which we have illustrated and described a preferred embodiment of our invention.

Of the drawings:

Fig. 4 is a section taken on line 4—4 of Fig. 3.

In general the present invention includes an electric induction furnace 10 of the lip pour type which is securely mounted upon a tilting frame 11. The frame and furnace are tiltable as a unit about a horizontal axis which intersects the lower surface of a V notch pouring lip 12 positioned in the upper portion of the furnace wall, and is normal to the direction of molten metal discharge. The axis of tilt is adjustable in a horizontal plane so that the molten metal stream discharged from the furnace may be delivered to a substantially fixed position during the furnace tilting movement. The furnace is of the induction electric heating type and is provided with flexible electric power and cooling fluid connections whereby metal heating by electrical energy may be continued during the pouring period. Such a furnace is particularly advantageous in the continuous casting of high melting temperature metals, such as steel.

Figure 1:
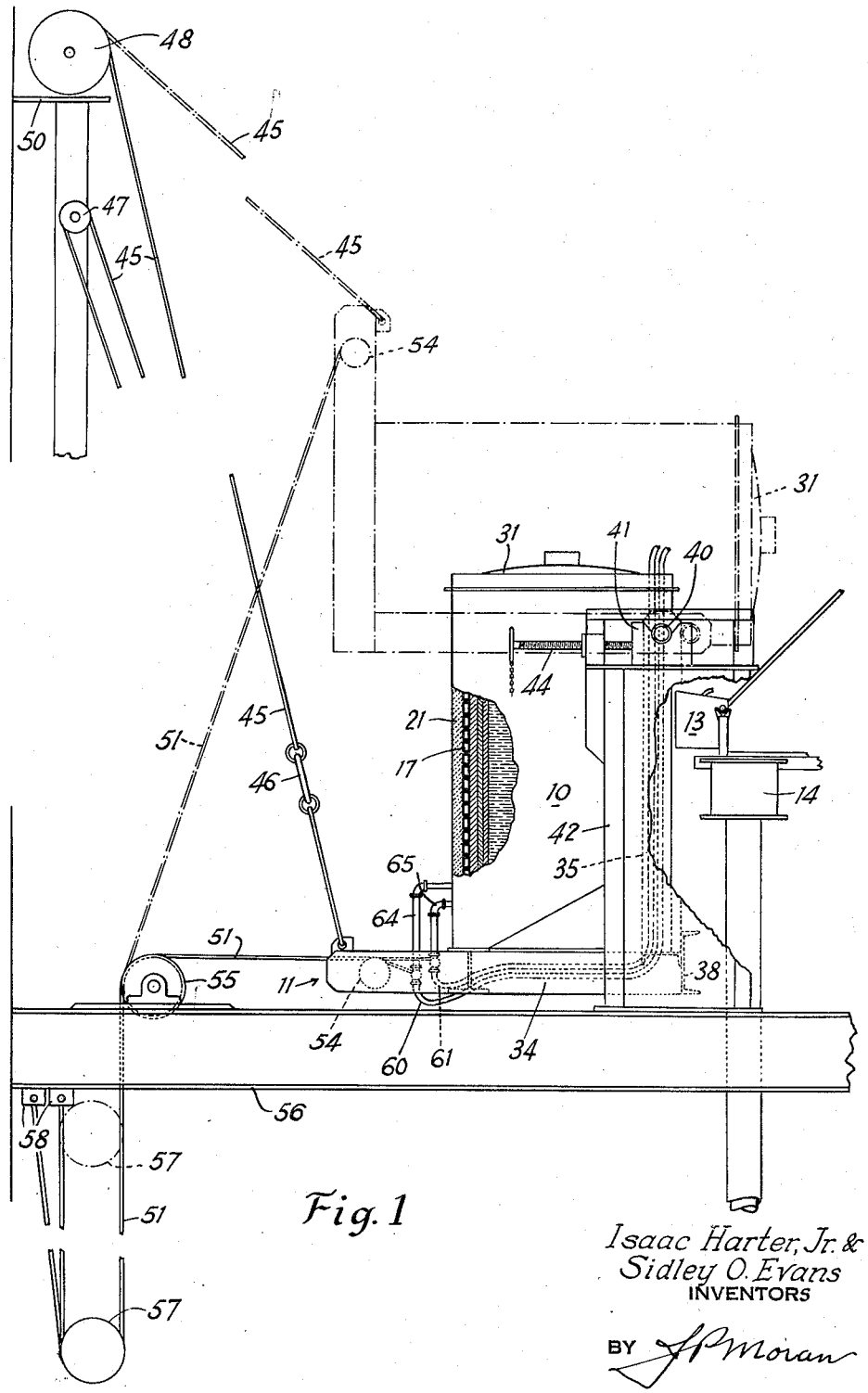
Fig. 1 is a side elevation view of an electric induction furnace constructed in accordance with the present invention.
Figure 2:
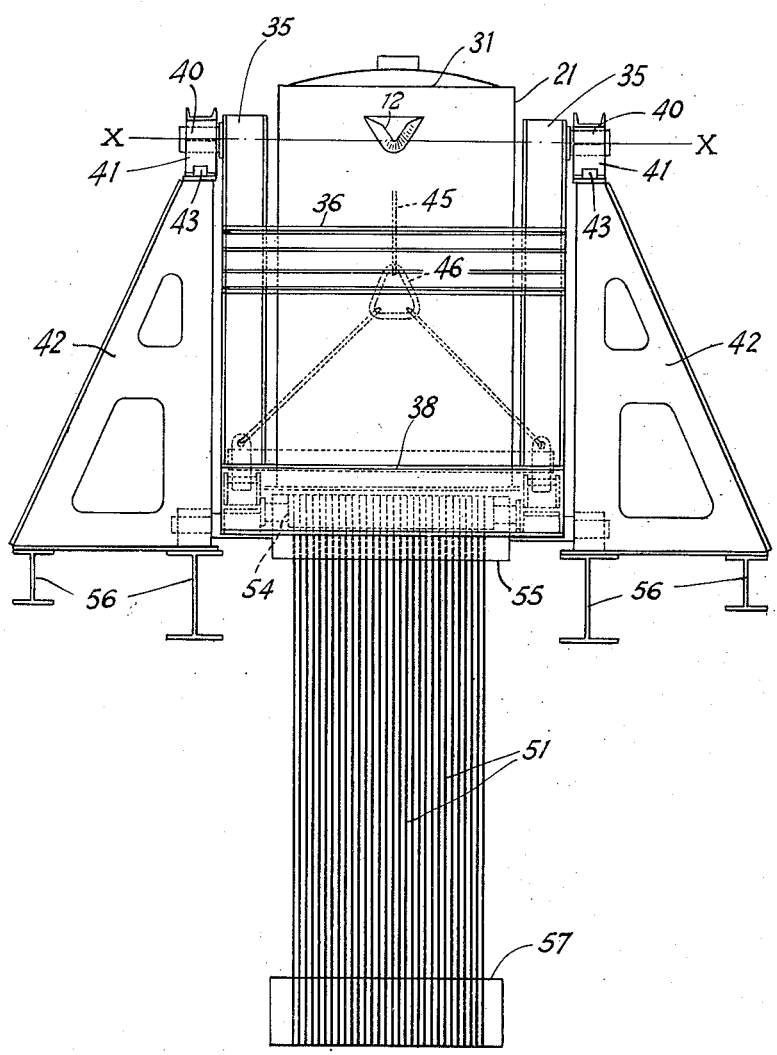
Fig. 2 is a front elevation view of the electric induction furnace shown in Fig. 1.
Figure 3:
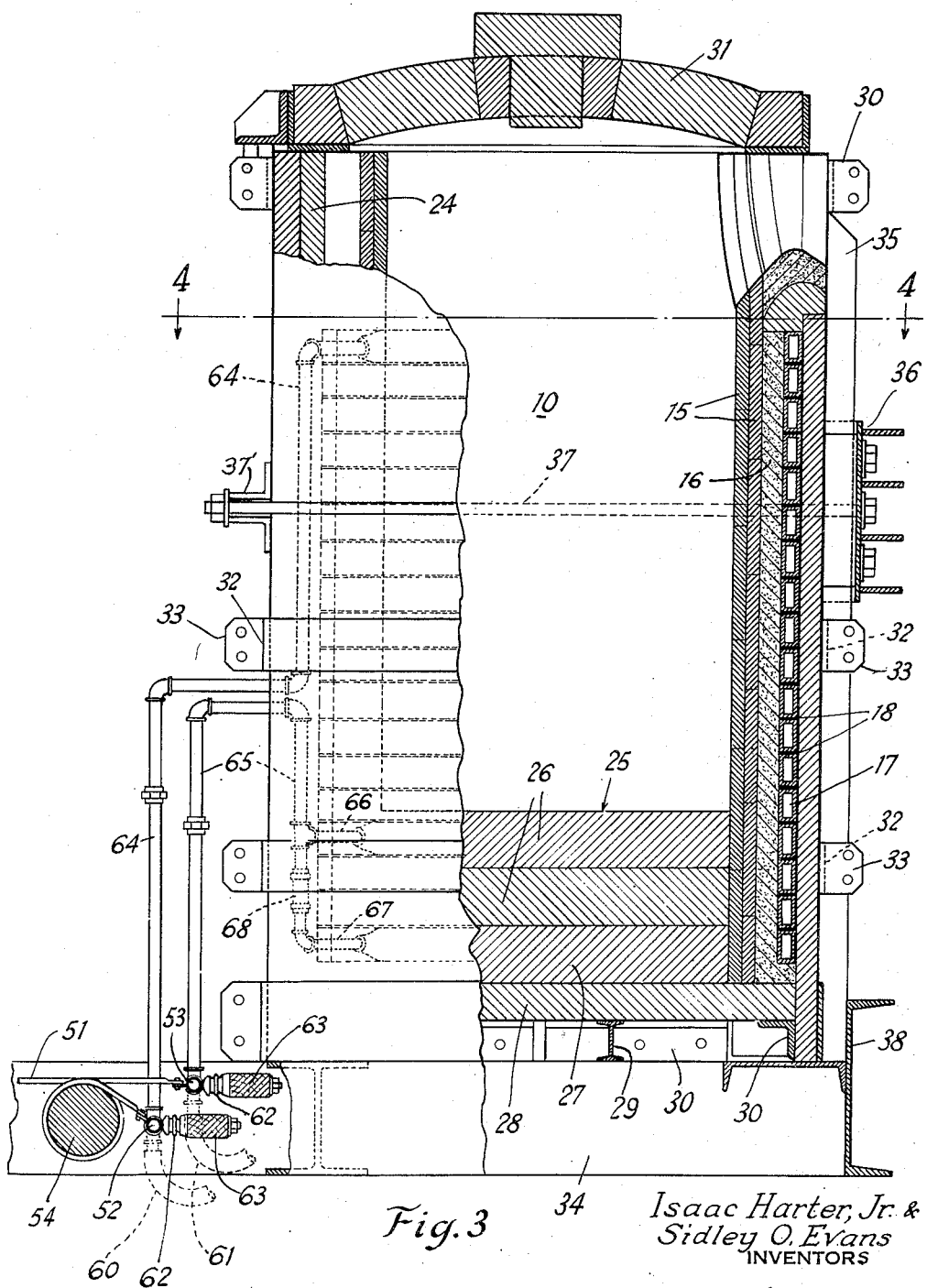
Fig. 3 is an elevation, partly in section, of a portion of the apparatus shown in Fig. 1.

An arrangement of the apparatus for the continuous casting of steel, incorporating the electric induction furnace of the present invention is disclosed in a co-pending application of I. Harter, I. Harter, Jr., and O. R. Carpenter, Serial No. 10,956, filed February 26, 1948. As described in said application and shown in Figs. 1 and 2, the induction furnace 10 is arranged to deliver molten metal to a tun dish 13 and thence continuously cast in a water cooled mold assembly 14. With the furnace 10 constructed and operated as hereinafter described, molten metal discharged from the furnace is maintained at a substantially uniform temperature and at a controlled discharge rate for delivery to the tun dish 13. As shown particularly in Figs. 3 and 4 the furnace has a central cylindrical molten steel holding space which has a capacity, below the level of the pouring lip 12, of approximately 6000 lbs. The furnace consists of the central cylindrical metal holding and heating receptacle which is supported in spaced relationship within an embracing structure as hereinafter described.

The metal holding and heating receptacle includes a cylindrical wall made up of radially positioned rows of preformed refractory blocks or tile 15, a monolithic ceramic layer 16, and a hollow helical metallic coil 17. The successive turns of the coil 17 are closely spaced to present a substantially continuous metallic inner face in embracing and supporting relationship to the monolithic layer 16. The bottom 25 of the cylindrical receptacle is formed by a plurality of layers of preformed tile indicated at 26, which extends transversely between and in interlocking relationship with the lower portion of the inner row of tile 15. A layer of heat insulating material 27 is correspondingly arranged below and in supporting relationship with the tile 26. The insulation 27, the lowermost tiles 15, and the lower portion of the monolithic layer 16 which extends outwardly in supporting relation to the lowermost turns of coil 17 are all supported by a transversely extending plate member 28 which is a part of the supporting structure as will be hereinafter described in detail.

The hollow helical coil 17 is of copper and of rectangular section, having a vertical outside dimension of 2⅝ inches and a transverse dimension of 1 inch, the metal wall thickness being of the order of $\frac{3}{16}$ inch. The successive turns of the coil are spaced apart approximately ⅛ inch by an asbestos tape 18 which is of sufficient thickness to provide adequate electrical insulation between the successive turns. The adjacent turns of the coil provide proper circumferential support for the enclosed monolithic layer 16 and a cooling surface for the extraction of heat, thereby maintaining the molten metal holding integrity of the refractory lining of the cylindrical receptacle. The lowermost turns of the coil extend below the level of the bottom tile 26 so as to impose a corresponding cooling action upon the circumferential portions thereof. A flow of cooling water through the hollow coil 17 is maintained when the furnace or receptacle is in use, the water being introduced at the top and discharged from the bottom of the coil as hereinafter described.

The supporting structure for the metal receptacle is of box-like arrangement made up of a combination of non-metallic and metallic parts arranged to provide structural strength while avoiding a relation of metallic parts which will permit the generation of appreciable induced electrical currents by the magnetic field from the furnace heating coil. The bottom of the structure, which rests upon the tilting frame 11, comprises marginal metallic members 30 and the transverse I-section members 29 arranged to support the plate member 28.

The four sides of the structure comprise members 21 which are formed of a single piece of non-metallic non-combustible temperature resistant material extending from their respective bottom angles 30 to which they are bolted to the top of the receptacle. Metallic corner angles 22 and the embracing sectional metallic bands 32 bind the four sides 21 into a rigid box-like structure. The outer circular wall of the receptacle including the pouring lip 12 is positioned against the inside of a member 21, as at 39, while the opposite side of the cylindrical container, as well as the transverse sides, are positioned away from the members 21 by non-metallic space blocks 24. The blocks 24 bear on the outside of the coil turns and extend throughout the full height of the members 21. At intermediate circumferential positions, additional radial supporting and restraining space members 23 extend between the outer surfaces of the coil turns and the inner corner of angles 22, the members 23 being coextensive with the height of the members 21 forming the embracing box.

The non-metallic material used for the members 21, 23, 24 and 28 is of cemented asbestos, the ingredients being so proportioned that the structural units have qualities of high density, electrical insulation, heat insulation, good strength, and heat resistance. The metallic angles 30 which are bolted to the bottom of members 21 and member 28 are of limited length and spaced apart so as to avoid a closed metallic loop for induced currents. The plurality of bands 32, of which the lowermost embraces the lower edges of members 21, are vertically spaced, each being bolted at spaced position to the members 21 and the corner angles 22. Each band 32 is made in a plurality of segments which are bolted together and electrically insulated from one another by the use of an insulating gasket as indicated at 33.

The furnace 10 is securely affixed to the tilting frame 11 so as to remain in a fixed position relative to the frame during the tilting motion of the assembly. The frame is formed with a structural steel platform 34 from one end of which a spaced pair of arm members 35 are perpendicularly extended. The arms are connected by a ribbed plate 36 intermediate their height. The furnace is held in position on the frame 11 by a pair of anchor rods 37, each of which extends along one side of the furnace and is attached at opposite ends to the plate 36 and a transverse member 37'. A channel member 38 forms the end of the platform 34 and extends above the upper surface of the platform to provide a foot brace for the front wall of the furnace. The shifting weight of molten metal within the furnace 10 resulting from its tilting motion is thus transmitted to the tilting frame.

The upstanding arm members 35 of the frame are each provided with a trunnion 40 extending outwardly on either side of the furnace and engaging a corresponding trunnion bearing 41 mounted on a pedestal 42. The trunnions 40 provide an axis of rotation X—X about which the assembly of the frame and furnace is tilted to pour metal through the lip 12. The lower edge of the lip lies on the axis X—X of tilting rotation. The trunnion bearings 41 are arranged to be slidable in a horizontal direction on guides 43 which are affixed to the upper ends of the pedestals. The horizontal position of both of the bearings is simultaneously regulated by individual adjusting screws 44 operated by a pair of interlocked reversing type motors (not shown). The tilting movement of the furnace about its axis X—X is obtained through movement of a cable 45 which is attached to a cable yoke 46 affixed to one end of the frame 11 remote from the axis of tilting rotation. The cable 45 is passed through a differential chain block 47 and is wrapped about a grooved hoisting drum 48 rotated by a reversible motor-driven gear drive. The block 47 is supported from the underside of a supporting framework 50 for the drum 48 and it is driven and so spaced above the furnace 10 that the furnace may be tilted at an angle of about 90° about its axis X—X, as shown in dotted lines in Fig. 1.

To maintain the optimum requirements for a controlled furnace pouring temperature, during the tilting of the furnace, the electric and water connections to the coil 17 must be flexible enough to maintain the power connections during the tilting of the furnace. This is accomplished by the use of a plurality of flexible electric cables 51 which are attached alternately to water cooled bus bars 52 and 53 secured to the frame 11 and connected with the coil 17 as hereinafter described. From the water cooled bus bars 52 and 53 the cables 51 are passed over a grooved drum 54, which is mounted in the platform 34, and over a grooved drum 55 which is rotatably mounted upon the supporting framework 56 for the pedestals 42. The cables 51 are looped downwardly below the level of the framework 56 and at the bottom of the loop are provided with a grooved drum 57 which acts as a counterweight to maintain proper alignment and to prevent kinking of the cables during the tilting movement of the furnace. The cables are separately attached to a pair of bus bars 58 which are affixed to the framework 56 in opposite relationship to bars 52 and 53 and are connected to a conventional control and frequency generating power source located at a conveniently lower level (not shown). Thus the cables are of equal length and their alternate arrangement minimizes reactance losses. The cooling water connections to the bus bars 52 and 53 on the furnace frame 11 are connected by means of rubber hoses 60 and 61 to a source of water supply and a water discharge connection (not shown) outwardly adjacent a trunnion 40.

The bus bars 52 and 53 mounted on the furnace frame are supported by electrical insulators 62 mounted upon wooden beams 63 extending transversely across the frame 11. One end of each bus bar is connected to a corresponding fitting for the rubber hoses 60 and 61 while the opposite end of each bus bar is provided with a copper pipe 64 and 65 leading to the coil 17. As shown particularly in Fig. 4, one of the pipes 64 is connected to the upper end of the coil 17 while the other pipe 65 is connected at two vertically spaced positions in the lower portion of the coil. It will be noted that the coil is provided with several turns in its lower portion which extend below the level of the upper surface of the refractory furnace bottom 25. One of the connections 66 from the copper pipe 65 is secured to a coil turn at approximately the level of the furnace bottom 25 while the other connection 67 from the pipe 65 extends to the lowermost turn of the coil 17. The connection 66 is through a solid copper stud to prevent a flow of water therethrough and to provide sufficient cross-sectional area to carry current without over heating. Between the levels of the two coil connections the pipe 65 is provided with a short section of rubber hose 68 which is clamped at opposite ends to spaced sections of the pipe 65. In this manner the pipe 65 provides an electrical connection 66 to one coil turn and provides a water connection 67 to the lowest coil turn in the lower portion of the furnace. The electrical connection to the lowest coil turn is broken by the insertion of the rubber hose section 68. Thus cooling water is circulated through the full length of the coil while the electric circuit extends from approximately the level of the bottom 25 of the furnace to the upper end of the coil 17. This arrangement provides a cooling effect to the furnace refractory bottom as previously described.

In operation, the furnace 10 is preheated by the use of a separate heating source, such as by burning gas, and then charged with molten metal. Electric power, at for example 400 to 800 volts and 750 to 1000 cycles, and cooling water are supplied to the coil. The cooling water flow is adjusted to maintain the coil temperature at an operating level at maximum power input conditions and once the desired flow rate is established it is maintained at the same value regardless of any reduction in the electric energy input.

After the metal has been brought to the desired pouring temperature and has been deoxidized, the furnace is tilted by operating the hoist drum 48. The stream of metal poured from the furnace lip 12 enters and passes through the tun dish 13, wherein a slag dam traps the slag and the molten metal is poured into the mold 14. The point of steel delivery into the tun dish 13 is advantageously regulated by adjusting the position of the trunnions 40 on the pedestals 42, thus changing the position of the axis X—X relative to the tun dish. The regulation of the position of the axis X—X and the angle of tilt may be accomplished simultaneously or separately, as desired, to obtain a proper delivery of molten steel, both as to the rate of flow and the position of delivery.

As the furnace is tilted, the position of the molten steel within the furnace shifts and the volume of steel is progressively reduced. Since the steel serves as a secondary circuit for the induction heating, the heating effect is diminished with the reduction and shifting of the molten steel charge. This will result in an increase in the voltage of the electric power supplied to the coil 17. We have found that manually or automatically regulating the impressed voltage on the coil to maintain a substantially uniform voltage during the tilting motion of the furnace will proportionately reduce the induced heating effect to maintain the temperature of the steel within close limits through a major portion of the pouring period.

In the furnace shown, the pouring temperature of the steel has been repeatedly maintained within a temperature range of 20° F. from the start of the pouring period to the last few minutes of pouring. During a short period at the very end of the pouring period the charge of molten steel within the furnace is so reduced as to effectively eliminate any electric induction heating thereof so that the power is cut off.

It will be noted that we provide an electric induction furnace of the coreless type which is characterized by its lightweight and economical construction. A hollow copper conductor of rectangular cross-section is wound in a helical coil with its closely spaced turns separated by a strip of insulating material. The coil embraces an internal lining of refractory material forming a cylindrical furnace wall to hold a molten metal charge therein. The electrical and water connections to the coil are arranged to heat the molten metal within the furnace and to provide cooling for the refractory materials forming the furnace. The lower turns of the coil between the connections 66 and 67 particularly provide an effective means for cooling the lower portion of the members 21. A lightweight box-like supporting structure of square horizontal cross-section encloses and positions the cylindrical coil with the lip pouring side of the furnace coil abutting one side of the box. The coil is spaced from the other sides of the box and maintained in position by a series of circumferentially spaced blocks.

The furnace is mounted upon a tilting frame which is arranged for rotational movement about a horizontal axis passing through trunnions projecting outwardly of the frame. The axis is adjustable in a horizontal plane and intersects the lower surface of the furnace pouring lip. The weight of molten steel within the furnace is transmitted through the furnace wall and the exterior supporting structure to the upstanding arms of the tilting frame. The electric and cooling water connections to the furnace coil are flexible for a continuation of the electric induction heating of the molten metal during the pouring period. As a result the molten steel is maintained at a substantially uniform optimum pouring temperature during the tilting motion of the furnace.

While in accordance with the provisions of the statutes we have illustrated and described herein the best form of the invention now known to us, those skilled in the art will understand that changes may be made in the form of the apparatus disclosed without departing from the spirit of the invention covered by our claims, and that certain features of our invention may sometimes be used to advantage without a corresponding use of other features.

We claim:

1. An electric induction furnace of the lip pour tilting type comprising refractory material defining the wall of said furnace, a hollow electric conductor coil embracing said walls, means for circulating cooling fluid through said hollow electric conductor, means for tilting said furnace about a horizontal axis, and means for maintaining the temperature of metal within said furnace substantially uniform during the tilting motion thereof including a pair of spaced bus bars each rigidly connected with one end of said coil, a plurality of flexible cables electrically connecting a fixed position source of power supply with said bus bars, with alternate cables connected to each of said bus bars for flow of electric power to said coil, and a counterweighted grooved drum suspended by and within a loop of each of said cables to maintain the alignment and relative spacing of said cables during the tilting motion of said furnace.

2. An electric induction furnace of the lip pour tilting type comprising refractory walls defining the sides of said furnace, a refractory bottom and a removable refractory top for said furnace, a hollow electric conductor coil embracing said walls and extending from a spaced position below the pouring lip to a spaced position below the bottom of said furnace, a cooling fluid connection to each end of said coil arranged to cause flow of said fluid through the full length of the coil, an electrical connection to the upper end of said coil, a second electrical connection to said coil at a position spaced above the lowermost turns of said coil and substantially at the level of said furnace bottom, means for electrically insulating the coil portion below said second electrical connection from the portion of the coil above said second electrical connection, means for tilting said furnace, and means for maintaining the electrical and cooling fluid connections to said coil during the tilting of said furnace.

3. An electric induction furnace of the lip pour tilting type comprising refractory walls defining the sides of said furnace, a refractory bottom and a removable refractory top for said furnace, a helical hollow electric conductor coil embracing said walls and extending from a spaced position below the pouring lip to the bottom of said furnace walls below the inner surface of said refractory furnace bottom, the adjacent turns of said coil spaced apart by a strip of dielectric material, a casing of cemented asbestos material enclosing said coil, a copper pipe connected to the upper end of said coil arranged to provide a flow path for electricity and cooling fluid, a second copper pipe connected with the lowermost turn of said coil to provide a flow path for cooling fluid, a solid copper stud connecting said second pipe with a coil turn upwardly spaced from said lowermost turn of said coil to provide a flow path for electricity, an electrically insulating section in said second pipe between its fluid flow connection with said lowermost coil turn and said solid copper stud, means for tilting said furnace, and means for maintaining electrical and cooling fluid connections to said copper pipes during the tilting of said furnace.

ISAAC HARTER, Jr.
SIDLEY O. EVANS.

REFERENCES CITED

The following references are of record in the file of this patent:

UNITED STATES PATENTS

| Number | Name | Date |
|---|---|---|
| Re. 16,054 | Moore | Apr. 28, 1925 |
| 876,946 | Custer | Jan. 21, 1908 |
| 1,008,406 | Davis | Nov. 14, 1911 |
| 1,068,643 | Franklin | July 29, 1913 |
| 1,113,134 | Moody | Oct. 6, 1914 |
| 1,126,079 | Queneau | Jan. 26, 1915 |
| 1,456,851 | Kettering | May 29, 1923 |
| 1,681,950 | Northrup | Aug. 28, 1928 |
| 1,682,388 | Lincoln | Aug. 28, 1928 |
| 1,783,128 | Morgan | Nov. 25, 1930 |
| 1,849,476 | Brace | Mar. 15, 1932 |
| 1,884,637 | Feehan | Oct. 25, 1932 |
| 1,895,421 | Northrup | Jan. 24, 1933 |
| 1,905,204 | Zinno | Apr. 25, 1933 |
| 1,926,573 | Willcox | Sept. 12, 1933 |
| 1,942,550 | Helgeby | Jan. 9, 1934 |
| 1,996,623 | Lindner | Apr. 2, 1935 |
| 2,014,349 | Wyatt | Sept. 10, 1935 |
| 2,073,597 | Northrup | Mar. 9, 1937 |
| 2,433,495 | Vogel | Dec. 30, 1947 |

FOREIGN PATENTS

| Number | Country | Date |
|---|---|---|
| 297,311 | Great Britain | Apr. 4, 1929 |
| 392,764 | Great Britain | May 25, 1933 |
| 615,418 | Germany | July 4, 1935 |